Patented Mar. 20, 1928.

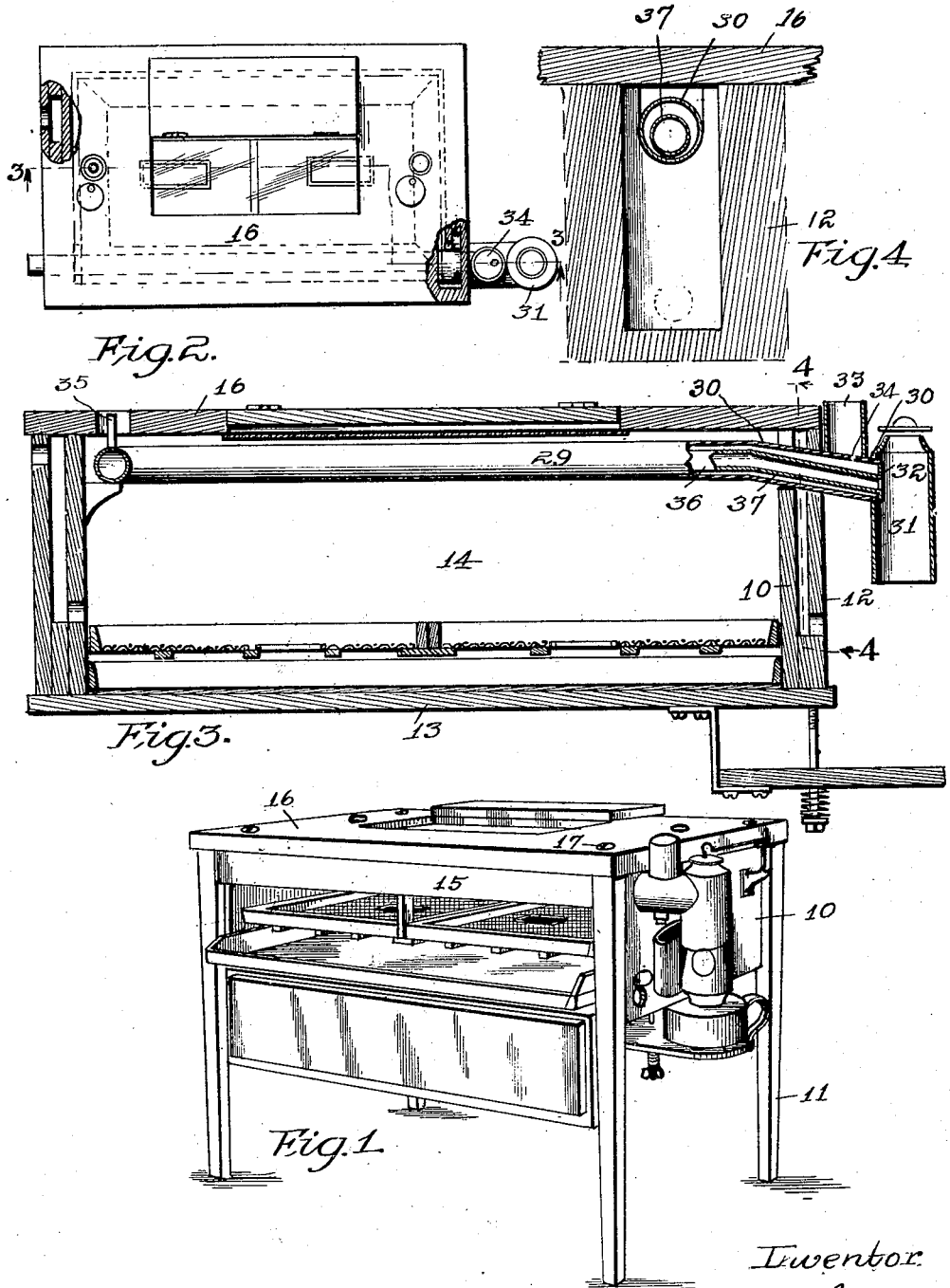

1,663,057

UNITED STATES PATENT OFFICE.

WILLIAM H. MONROE, OF COLFAX, IOWA.

HEATER FOR INCUBATORS.

Application filed February 15, 1924. Serial No. 693,039.

The object of my invention is to provide a new and improved heater for incubators of simple, durable and inexpensive construction, and which is more efficient and reliable in its operation.

A further object is to provide in an incubator heater of that type employing water as a medium for distributing the heat throughout the incubator, new and improved means for conducting and distributing the water so that the incubator will be more uniformly heated.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is a perspective view of an incubator showing the manner in which my improved heater is applied.

Figure 2 is a plan view of my improved incubator with a portion of the top broken away to show certain interior constructions.

Figure 3 is a longitudinal vertical sectional view taken on the line 3—3 of Figure 2.

Figure 4 is an enlarged detail sectional view taken on the line 4—4 of Figure 3.

My improved heater as applied to an incubator comprises a body portion 10 mounted on suitable supporting legs 11, the body portion being provided with end members 12, a bottom 13, a back 14 and a front 15 and a top member 16 detachably attached to the body portion 10 by means of screws 17.

For heating the incubator I have provided a rectangular and tubular heating tank 29, the outline of which is clearly shown in dotted lines in Figure 2. One corner of the tank 29 is provided with an outwardly and downwardly extending portion 30 which terminates in a lamp flue 31 formed of a single thickness of sheet metal. The outer end of the portion 30 is closed with an end plate 32. The member 30 is provided with a cup 33 soldered to the top thereof, and has an opening 34 through which water may be poured into the interior of the tanks 29 and 30. One end of the member 29 is provided with a vent pipe 35 which permits the air to escape as the tank member 29 is filled.

Extending longitudinally through one side of the tank 29 I have provided a heat conducting pipe 36, which has one end extending through one end of the incubator and its opposite end provided with a downwardly extending portion 37 which is mounted eccentrically in the member 30, as clearly illustrated in Figures 3 and 4. The free end of the member 37 extends through the end plate 32 so that heated gases which enter the flue 31 will pass through the tubular member 37, thence through the tubular member 36 and be discharged to the open atmosphere. The members 36 and 37 form the heating element for heating the water within the tanks 29 and 30.

By arranging the member 37 eccentrically with the member 30, with the said member 37 near the lower side of the member 30, I have provided means whereby more room is formed above the member 37 for the heated water, and increased circulation will result.

By inclining the member 30 it will be seen that the heated water will flow more readily from the member 30 to the member 29 and I find by actual practice that by thus arranging the heating element within the water tank, I have greatly increased the circulation of the water, and consequently can bring the air within the incubator more quickly to the desired temperature, and maintain that temperature uniformly within the incubator, inasmuch as the temperature of the water in the end of the tank 29 which is farthest from the lamp is practically the same as the temperature in the lamp end, due to the rapid and easy flow of the water within the tank.

I have found by actual test that if the heating elements 36 and 37 are mounted centrally within the tank and maintained in a straight line, as heretofore usually practiced, the water in the end of the tank adjacent to the lamp maintains a temperature several degrees above the water in the further end of the tank, which heats the ends of the incubator adjacent to the lamp more than the opposite end of the incubator, and the eggs in the end of the incubator adjacent to the lamp hatch sooner than those in the opposite end.

Thus it will be seen that I have provided an incubator heater of simple, durable and inexpensive construction which has improved means of heating and maintaining the proper temperature within the incubator.

I claim as my invention:

A heater for incubators comprising a tubular tank in the form of a loop designed to be supported substantially horizontally, one portion of said tank having an inclined downwardly and outwardly extending tubular portion, a vertical non-water-jacketed lamp flue adjacent to the outer end of said downwardly and outwardly extending portion, a heating pipe extending longitudinally through one side of said loop and through said downwardly and outwardly extending portion and communicating with the interior of said flue, that portion of said heating pipe which extends through the downwardly and outwardly extending tubular portion of said tank being mounted below the center of the inclined tubular portion, substantially as described and for the purposes stated.

Des Moines, Iowa, October 17, 1923.

WILLIAM H. MONROE.